United States Patent Office 3,248,351
Patented Apr. 26, 1966

3,248,351
POLYOLEFINS TREATED WITH THE ZINC SALT OF A MONOCARBOXYLIC ACID
Richard Louia Ray, Baton Rouge, La., assignor to Esso Research and Engineering Company, a corporation of Delaware
No Drawing. Filed Dec. 27, 1962, Ser. No. 247,520
5 Claims. (Cl. 260—23)

The present invention relates to an improved process for treating high molecular weight solid polyolefins to improve the color of the said polyolefins. One aspect of this invention relates to treating the said polyolefins in a solvent solution before the addition of oxidation and/or color stabilization additives with a zinc salt of an aliphatic saturated monocarboxylic acid and then drying at elevated temperatures, e.g. 80° to 300° F., to remove the solvent and/or catalyst quenching agent. The dried material is then treated with the desired oxidation and/or color stabilization additives, preferably dissolved in a solvent. Another aspect of this invention relates to stabilizing uninhibited, raw, highly crystalline polyethylene or polypropylene by first treating the polymer with the zinc salt, drying and then treating it with a solution of oxidation and heat stabilizers.

Prior to the present invention, it was discovered that an improvement in color and color stability could be obtained by treating polyolefins with a combination of zinc salts of fatty acids and stabilizers, such as dipinenediphenol and dilauryl thiodipropionate. It has now been surprisingly discovered that by first treating the raw polymer, either in a substantially dry state or wet, with the zinc salt, drying to remove any liquid in the wet polymer, and then treating the dried material with oxidation and/or color stabilization additives, preferably dissolved in a solvent, large improvements in color and color stability are obtained.

Although it is not intended to limit this invention to any explanation of the theoretical mechanism involved, it is postulated that by adding the zinc compound first, i.e. prior to the addition of other additives, it complexes with the catalyst residue rendering it innocuous to reactions with the other additives which would normally form color bodies.

As is well known, hydrocarbon polymers, when exposed to oxygen and/or heat, will degrade and deteriorate, forming color and losing molecular weight. While the zinc salts mentioned above will improve color, it is usually necessary to add other stabilizers to prevent oxidative and thermal degradation. There are many substances that will prevent oxidation and impart heat stability to polyolefins. The stabilizers that have been found to be most useful in the present invention are sulfides, hindered phenols and hydrocarbyl phosphites, especially trialkyl phosphites. Since many different oxidation and thermal stabilizers can be used in practicing the invention, the essence of the invention resides in thoroughly admixing the polymer, which still contains a small catalyst residue and preferably while it is wet with alcohol, with a zinc salt prior to adding the other stabilizers.

The polyolefins stabilized in accordance with the present invention are polymers of alpha olefins having 2 to 8 carbon atoms in the molecule and may suitably be exemplified by polyethylene, polypropylene, ethylene-propylene copolymers, ethylene-butene-1 copolymers, ethylene-pentene-1 copolymers and the like having viscosity average molecular weights in the range from about 10,000 to about 1,000,000. These polymers are produced by polymerization of the corresponding olefins employing Ziegler-type polymerization catalysts, e.g. those obtained by partially reducing in a diluent a halide of a transition metal selected from Groups IV–B, V–B, VI–B and VIII of the Periodic System of Elements (The Henry D. Hubbard Periodic Chart of the Elements, 1947 ed., revised by W. F. Meegers; W. M. Welch Mfg. Co., Chicago, Ill.). Examples of suitable halides from which the catalyst is prepared are the halides of titanium, zirconium, hafnium, thorium, uranium, vanadium, columbium, tantalum, chromium, molybdenum, tungsten, and mixture thereof. Exemplary of suitable compounds are titanium tetrachloride, titanium tetrabromide, zirconium tetrachloride, and the like. As is well known in the art, these catalysts are activated by admixing them with organo aluminum compounds, especially mono-, di- and tri-$C_1$ to $C_5$ alkyl aluminum compounds, such as triethyl aluminum, monopropyl aluminum dichloride and dimethyl aluminum chloride. The trialkyl aluminum compounds are the preferred activators. The molar ratio of metal halide to aluminum compound is usually about 0.2 to 2, preferably 0.5 to 1.

In preparing catalysts suitable for use in forming the polymer treated in accordance with the present invention, the metal halide is reduced in solution in any suitable manner, such as by means of chemical reaction with a suitable chemical compound having reducing properties, e.g. aluminum or titanium, or by irradiation. This is done to reduce at least a portion, and preferably more than about 30 percent, of the metal in the metal halide to a lower valence state. The product of the reduction step, comprising the diluent and the at least partially reduced metal halide, is employed as the medium in which olefin polymerization is effected.

The invention has special application to highly crystalline polyethylene, polypropylene and copolymers thereof made with a cocrystallized catalyst comprising

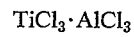

$$TiCl_3 \cdot AlCl_3$$

in which the ratio of Ti to Al is 3:1, and activated with triethyl aluminum. Other catalysts of this type are described in U.S. Patent 3,032,510, the disclosure in which are incorporated herein by reference.

The diluent for the polymerization reaction should be a nonreactive, nonpolar organic medium in which the transition metal halide starting material is soluble to an extent at least sufficient to provide at least a 0.1 weight percent solution of the metal halide starting material. For example, in preparing the polymerization medium, a 0.1 to 10 weight percent solution of metal halide in the diluent may be employed. The amount of diluent used can range from about 5 to 15 parts by weight per part by weight of catalyst, including the activator.

Among the diluents that may be employed are saturated aliphatic hydrocarbons, preferably containing from about 5 to 10 carbon atoms per molecule. Specific examples of such diluents include isopentane, n-hexane, heptane, octane, decane, nonane and mixtures thereof, or other saturated petroleum hydrocarbons. A particularly desirable diluent is n-heptane. It will be understood that other diluents may be used, such as aromatic diluents (benzene, xylene, etc.), halogenated aromatic hydrocarbons (monochlorobenzene, dichlorobenzene, etc.), gas oil distillate fractions obtained from the catalytic cracking of virgin gas oil feed stocks, diesel oil, etc. If desired mixtures of two or more compatible, miscible diluents may be used. The diluent should be substantially completely free from oxygen, water and similar compounds of strong polarity which are reactive with the products obtained by reduction of the amphoteric metal halide.

The polymerization reaction is suitably conducted at a temperature in the range from about room temperature to 380° F. depending upon the solvent and other conditions. Higher temperatures may be employed, but are generally undesirable in that catalyst decomposition may be encountered. Subatmospheric pressures and pressures up to about 250 atmospheres may be employed in forming the polymer treated in accordance with the present invention. It is generally preferred to employ pressures ranging from atmospheric pressure to about 100 p.s.i.g. Reaction times of about 60 minutes are required, although reaction time may range from about 10 minutes to 24 hours.

As a result of subjecting the olefins of the type illustrated before to treatment with a catalyst of the nature described, olefin polymers are formed having high molecular weights. The polymers are essentially insoluble in the nonpolar organic liquid and, therefore, the raw product is a slurry. It is these polymers, after quenching in the conventional way with a lower molecular weight, saturated, monohydric primary alcohol, e.g. methanol containing HCl, to deactivate any catalyst and separation from the diluent and most of the quenching liquid, which are treated by adding the zinc salts in accordance with the present invention since the polymer particles are in a finely divided state, have a high surface area, and rapidly adsorb oxygen. A highly suitable quenching agent is a mixture of 80 to 95 weight percent methanol and 5 to 20 weight percent HCl.

In a preferred embodiment of the invention, polyolefin containing a trace amount, e.g. about 0.001 to 0.1 weight percent, of residual ash consisting of metal compounds, e.g. aluminum, titanium and iron oxides, is admixed with the zinc compound while the polymer is in the washed but undried and uninhibited state (commonly referred to as wet unfinished cake). The zinc salts of saturated, aliphatic carboxylic acids which can be used in this process usually contain 1 to 12 carbon atoms in each molecule. The preferred compounds are salts made from branched hydrocarbyl monocarboxylic acids having 6 to 8 carbon atoms. Examples of suitable straight chain and branched zinc compounds are salts of formic, acetic, propionic, butyric, isobutyric, caproic, 2-ethyl hexanoic and undecanoic acid. The salts are used in an amount in the range of 0.01 to about 1 weight percent, preferably 0.01 to about 0.5 weight percent, e.g. 0.08 weight percent based upon the weight of the solid polymer.

Following addition of the zinc salt, the polymer cake is freed of the methanol or other aliphatic alcohol, e.g. ethanol or isopropanol, used to deactivate the catalyst. This is generally effected by drying, preferably under vacuum with an inert sweep gas system, at temperatures in the range of 150° to 380° F., preferably 200° to 220° F., e.g. 210° F., utilizing pressures of −30 to +50 p.s.i.g. Suitable inert sweep gases are the inert gas elements of the Periodic Chart, i.e. nitrogen, argon, etc.; inert refinery gases, such as methane, ethane, ethylene and propylene and deoxygenated superheated steam.

After the polymer is dried, the oxidation and/or heat stabilization additives are added, preferably in the presence of a solvent carrier. Various combinations of the following preferred additives are used in the amounts and as described below.

Dipinene-diphenol may be employed in an amount in the range from about 0.01 to about 1 percent by weight of the solid polymer. An amount in the range from about 0.1 to about 0.5 weight percent is preferred. The dipinene-diphenol is a resinous material with the pinene and phenol being present in a ratio of about 1:1. The dipinene-diphenol has a molecular weight in the range from about 450 to about 550 and may be represented by the formula $(C_{10}H_{16})_2 (C_6H_5OH)_2$.

Dipinene-diphenol is prepared by reacting 1 mole of α-pinene and 1 mole of phenol in an aromatic diluent, e.g. benzene, in the presence of boron trifluoride etherate as a catalyst at a temperature from about 70° to about 122° F. to form the resinous dipinene-diphenol product. If desired, a mixture of α- and β-pinene can be used. The product is washed with hot water to remove catalyst and unreacted material. Thereafter, the washed product is dried, filtered, and then distilled to remove benzene and any light fractions. The material remaining is the dipinene-diphenol product. The dipinene-diphenol product has a ring and ball melting point in the range of about 75° to about 150° C. and is completely soluble in methanol.

Suitable sulfur-containing heat stabilizers are dilauryl thiodipropionate, di-$C_{10}$ to $C_{18}$ alkyl thiodipropionates, e.g. ditridecyl thiopropionate and distearyl thiopropionate, di-$C_{10}$ to $C_{18}$ alkyl sulfides, e.g. dicetyl sulfide, and organo mercaptans, such as bis(tetradecyl mercapto)-p-xylylene, and bis(octadecyl mercapto)-p-xylylene. The sulfide costabilizers are preferably employed in amounts of from about 0.1 to 10 percent by weight of the solid polymer, the preferred concentration being about 0.2 to about 5 percent by weight. Oxidation stabilizers that can be used in combination with the aforementioned sulfides are alkyl phosphites, such as tri-n-octyl and tri-n-decyl phosphite, having two to eighteen carbon atoms in the alkyl groups, and/or aryl phosphites, such as triphenyl phosphite. When the alkyl and/or aryl phosphite is employed, it may suitably be used in an amount from about 0.1 to about 1.5 percent by weight of the solid polymer. Amounts of about 0.1 to about 1 percent by weight of the phosphite are preferred. Similar amounts of other antioxidants such as hindered phenols, e.g. 2,6-ditertiary butyl cresol, 2,6-dimethyl phenol and other di-$C_1$ to $C_5$ alkyl substituted phenols, can be used in place of the organo phosphorus compounds.

In adding the heat and oxidation stabilizers to the polyolefin of the present invention, the additives may suitably be added as such or in the form of a 1 to 50 wt. percent solution. Suitable solvents include lower boiling hydrocarbon liquids, e.g. $C_5$ to $C_{10}$ saturated and aromatic hydrocarbons, such as n-heptane and benzene. Likewise, the dipinene-diphenol may be added to the polymer in a lower molecular weight hydrocarbon solvent, such as p-xylene. Similar solvents can be used for the sulfur-containing stabilizers.

The zinc salt is preferably dissolved in a relatively low boiling solvent, such as methanol, benzene or n-heptane, before it is admixed with the wet polymer. If desired, however, it can be added to the polymer in an undiluted state.

The various additives may be sprayed over pellets or particles of the polymer, and the resulting mixture may then be extruded through a suitable extrusion device to cause the formation of a homogeneous mixture. While it is preferred to add the additives to the polyolefin in a solution, they may, of course, be incorporated in any suitable manner to the polymer particles. If the additives are added as solids, the resulting mixture can be milled or extruded to intimately mix the additives with the polymer, thereby forming a homogeneous product.

Following the addition of all of the stabilizing additives, additional drying and/or mixing is used to evaporate any solvent present, e.g. carrier used to add the additives. The product so prepared is then passed to the usual finishing steps for the preparation of commercial products, such as molding powder, etc.

The composition of the present invention is quite important and useful in formation of products such as molded and extruded devices and articles, or the composition may be formed in films for use in wrapping foodstuffs and other articles, or the polymer composition may be extruded as a filament to be used in weaving and forming of cloths, fibers, and other similar materials.

The following data are submitted to show the critical effect of the manner of addition of the zinc compound upon the color of the product obtained.

*Example 1*

A low pressure, high crystalline polyethylene (density 0.95) was prepared by polymerizing ethylene at a temperature of 175° F. under a pressure of 150 pounds per square inch gauge for about an hour in the presence of a cocrystallized titanium trichloride·0.33 aluminum trichloride catalyst activated with triethyl aluminum (aluminum/titanium weight ratio equals 2/1 and a diluent consisting of paraxylene. The reaction vessel contained 9 parts by weight of diluent per part by weight of ethylene monomer. The amount of catalyst employed was equal to 0.1 part by weight per 100 parts by weight of ethylene monomer. Upon completion of the polymerization, 1 volume of methyl alcohol was added for each 4 volumes of reaction mixture, and the alcohol-containing mixture was centrifuged to recover a cake of polyethylene. The cake was slurried with about three times its weight of methyl alcohol and centrifuged again. The wet, uninhibited polyethylene (0.018 weight percent ash on dry polymer) cake, which consisted of about 60 to 70 weight percent polymer and 30 to 40 weight percent methyl alcohol, was admixed with the additives and then dried at temperatures of 200° to 220° F. under slightly reduced pressure (−5 p.s.i.g.) using a dry nitrogen sweep gas. After drying, the samples were pressed into fused pads and their color was evaluated.

The color scale used is one in which the value "1" is assigned to the whitest polymer obtainable, i.e. one having a whiteness similar to titanium dioxide, and the value "20" is assigned to a polymer having a dark brown color. The numbers between 1 and 20 are given to polymers having varying degrees of color between white and dark brown. For instance, a polymer having a light cream color would have a color rating of 3, whereas a polymer having a dark yellow color would have assigned a value of 10. For most commercial uses, crystalline poly-alpha-olefins should have a color rating of 1 or 2.

A 40 weight percent solution of zinc 2-ethyl hexanoate in n-hexane was combined with dilauryl thiodipropionate (DLTDP) and a stabilizer "A" consisting of the sodium catalyzed reaction mixture of 28 parts by weight diphenyl phosphite, 28 parts by weight triisooctyl phosphite, 22 parts by weight of 4,4'-(1,1-butylidene)-bis(6-tertiary butyl-3-methyl phenol) and 21.8 parts by weight of zinc 2-ethyl hexanoate, and the combination of stabilizers was added to the wet polyethylene cake described above, as a 40 weight percent solution prior to drying the cake in a rotary drier at 200° to 220° F. Mixture "A" was prepared by heating the materials to 212° F. in the presence of a small piece of sodium and then cooling the reaction mixture to room temperature. The polymer pad obtained had a definite yellow color and was assigned the value of 6 on the color scale. (The amount of each stabilizer added was as follows: zinc compound, 0.08 weight percent; dilauryl thiodipropionate, 0.005 weight percent; and the stabilizer "A," 0.02 weight percent based on the dry polymer.) However, when the wet uninhibited polyethylene cake was admixed first with 0.08 weight percent zinc 2-ethyl hexanoate in the form of a 40 weight percent solution in n-hexane for several minutes, dried and thereafter the other additives, i.e. DLTDP and the stabilizer mixture "A," in the form of 40 wt. percent n-hexane solution followed by further drying at 220° F., the polyethylene pad made from the dry polymer had a white color and was assigned a value of 2. Thus, by simply adding most of the zinc compound to the wet cake first, a commercially acceptable polyethylene product was obtained rather than a yellow-colored polymer having limited commercial utilization.

When the last described process was repeated without the DLTDP additive, similar results were obtained. Likewise, when another stabilizer "B," which was the same as stabilizer "A" except that the phenol compound was 4,4'-thiobis(6-tertiary butyl-3-methyl phenol), was substituted in said process, and no DLTDP was used, the polymer color was similarly improved by adding the zinc compound first. Analogous results are gotten when dipinenephenol is used in place of the methyl phenol in stabilizer "A."

When polyethylene is treated in accordance with the present invention with other zinc salts, such as zinc octanoate, similar results are obtained. Likewise, other stabilizers can be used in the second step to improve the oxidative stability of the polymer.

*Example 2*

The color of solid, isotactic polypropylene (90% crystallinity) prepared in accordance with Example 1 is also improved by first mixing a zinc compound, such as 0.08 weight percent zinc 2-ethyl hexanoate (40 weight percent solution in n-hexane), with the wet uninhibited polymer containing a trace amount of catalyst residue, and thereafter adding a concentrated hydrocarbon solution (40 weight percent) of other stabilizers, e.g. 0.005 weight percent DLTDP and 0.02 weight percent of a mixture of alkyl phosphites and a hindered phenol, such as mixture "A" described in the previous example.

As mentioned above, this process can also be used to improve the color of not only highly crystalline homopolymers of alpha olefins but also both crystalline and rubbery copolymers of ethylene and higher alpha olefins, e.g. propylene.

The invention, of course, has its greatest application to polyolefins that are compounded with stabilizers which form colored products with the residue of the catalyst utilized to prepare the polymer. By mixing the polymer with the zinc compound before contacting it with the color-forming stabilizers, it is possible to avoid the discoloration of the polymer and yet be able to use the most effective antioxidants and other similar compounds in the polymer.

What is claimed is:
1. The process of claim 5 in which the polyolefin is highly crystalline polypropylene.
2. The process of claim 5 in which the polyolefin is polyethylene.
3. The process of claim 5 in which the organic acid is 2-ethyl hexanoic acid.
4. In the process for stabilizing a crystalline polymer of a lower alpha olefin containing a trace quantity of titanium- and aluminum-containing catalyst residue wherein the polymer is mixed with methanol to deactivate the catalyst which is separated to leave a wet polymer which is subsequently dried and wherein a combination of zinc 2-ethyl hexanoate and at least one oxidation stabilizing compound, which forms colored products with said catalyst residue, is mixed with the polymer, the improvement which comprises thoroughly admixing the zinc 2-ethyl hexanoate with the methanol-wet polymer, thereafter drying the polymer to remove substantially all of the methanol, mixing the dried polymer with a hydrocarbon solution of the oxidation stabilizing compound, drying the polymer to remove essentially all of the hydrocarbon liquid in the polymer and recovering a stabilized polymer having a substantially white color.
5. In a process for preparing a crystalline polymer of a lower alpha olefin by polymerizing said alpha olefin in the presence of a transition metal-containing catalyst wherein the catalyst is deactivated with a lower molecular weight saturated monohydric alcohol which is separated to leave a wet polymer which is subsequently dried and wherein the polymer is mixed at room temperature with a zinc salt of a mono-carboxylic acid having 1 to 12 carbon atoms and at least one oxidation stabilizing compound, an improvement which comprises thoroughly admixing at room temperature 0.01 to about 1 wt. percent of the zinc salt with the alcohol-wet polymer containing at least a trace of residual catalyst prior to adding the oxidation stabilizing compound and recovering a stabilized polyolefin having good color.

References Cited by the Examiner

UNITED STATES PATENTS

| 2,827,445 | 3/1958 | Bartolomeo et al. | 260—23 |
| 2,956,983 | 10/1960 | Rindtorff et al. | 260—45.75 |
| 2,982,756 | 5/1961 | Mercier et al. | 260—45.75 |
| 3,075,959 | 1/1963 | Wagener | 260—94.9 |
| 3,144,422 | 8/1964 | Homberg | 260—13 |

LEON J. BERCOVITZ, *Primary Examiner.*